(No Model.) 7 Sheets—Sheet 4.

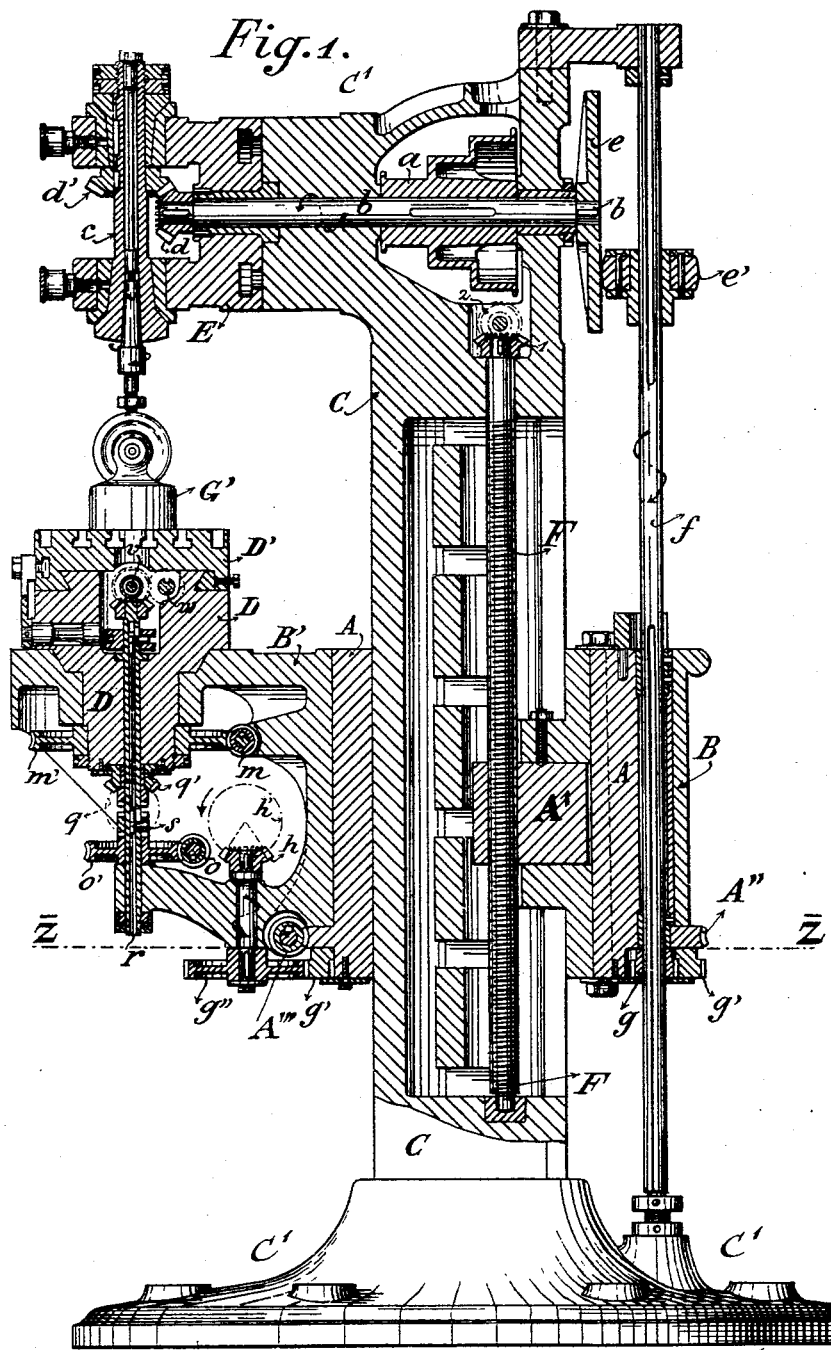

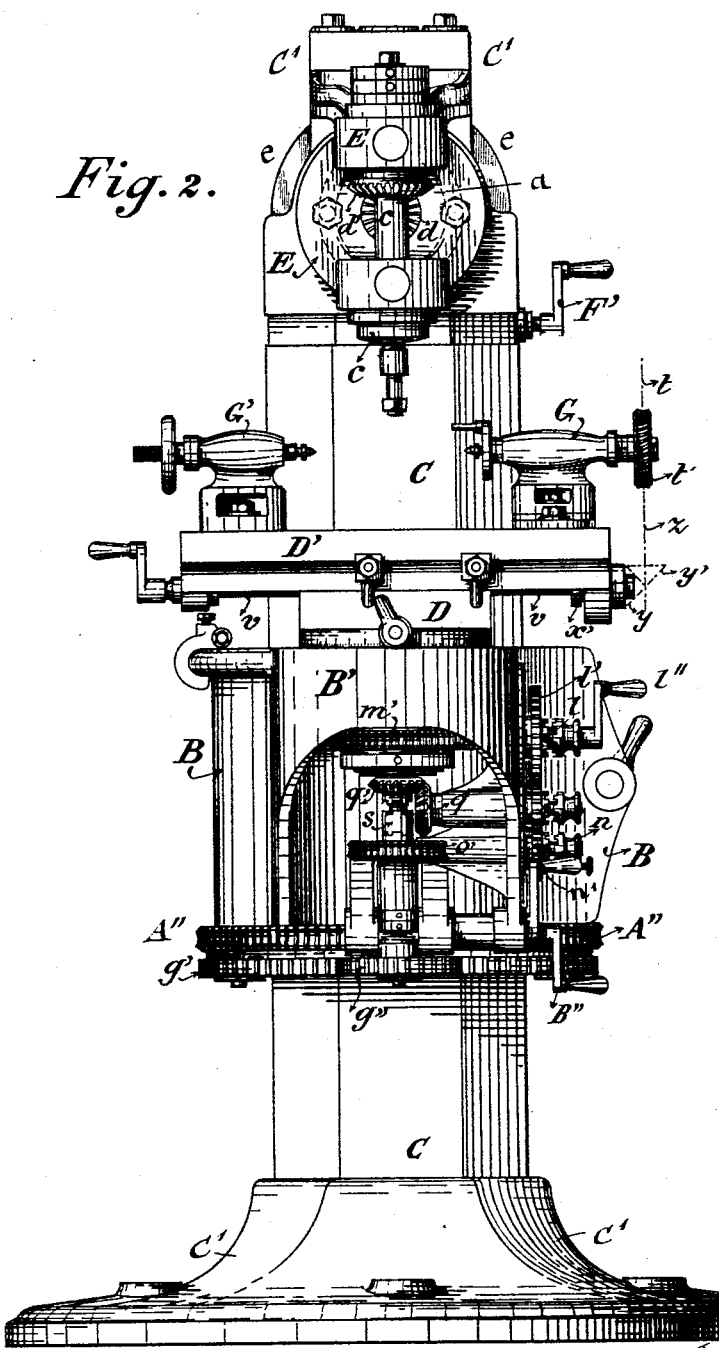

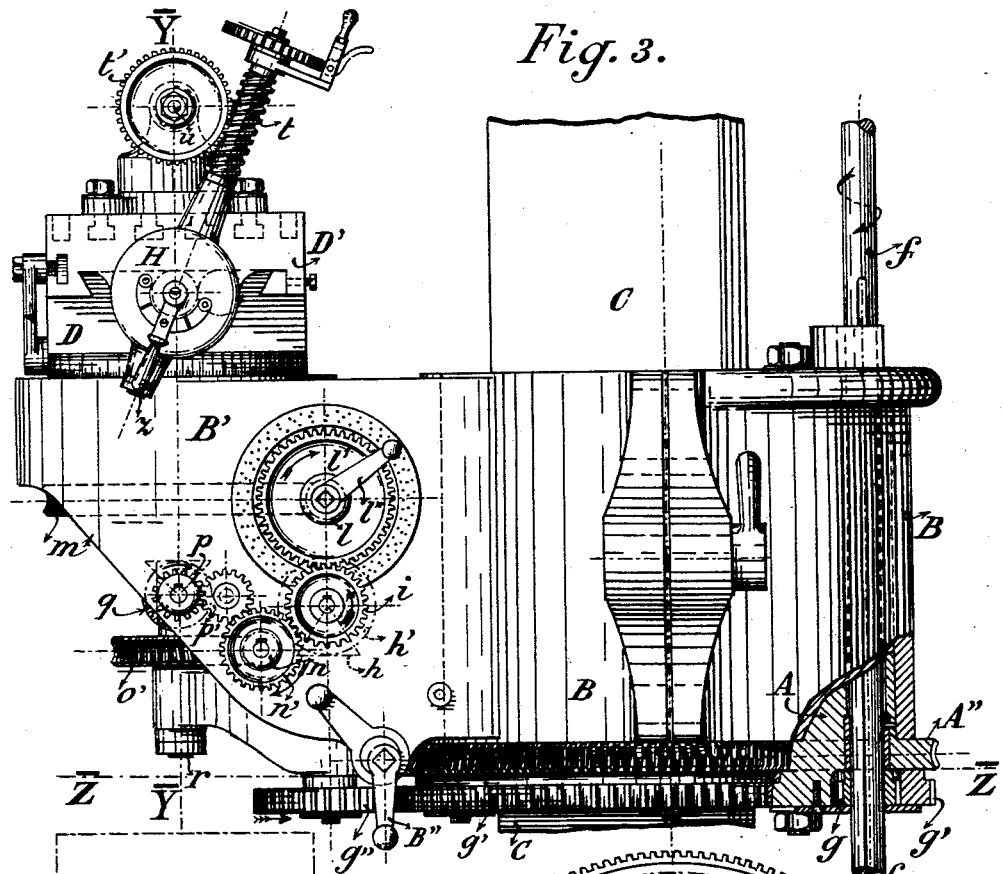
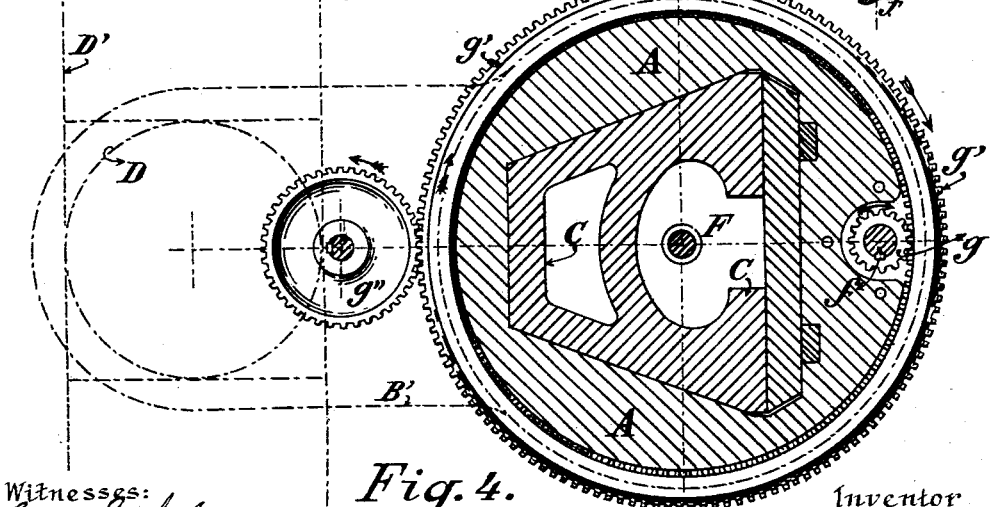

J. W. VON PITTLER.
MILLING MACHINE.

No. 580,195. Patented Apr. 6, 1897.

Witnesses:

Inventor
Julius Wilhelm von Pittler
by Goepel & Raegener
Attorneys.

(No Model.) 7 Sheets—Sheet 5.

J. W. VON PITTLER.
MILLING MACHINE.

No. 580,195. Patented Apr. 6, 1897.

Witnesses:

Inventor
Julius Wilhelm von Pittler
by
Attorneys.

(No Model.)

J. W. VON PITTLER.
MILLING MACHINE.

No. 580,195.  Patented Apr. 6, 1897.

7 Sheets—Sheet 6.

Witnesses:
George W. Jackel
Carl Kable

Inventor
Julius Wilhelm von Pittler
by Jaques & Jaegeur
Attorneys.

(No Model.) 7 Sheets—Sheet 7.

J. W. VON PITTLER.
MILLING MACHINE.

No. 580,195. Patented Apr. 6, 1897.

Witnesses:

Inventor
Julius Wilhem von Pittler
by
Attorneys.

UNITED STATES PATENT OFFICE.

JULIUS WILHELM VON PITTLER, OF LEIPSIC-GOHLIS, GERMANY.

MILLING-MACHINE.

SPECIFICATION forming part of Letters Patent No. 580,195, dated April 6, 1897.

Application filed October 1, 1895. Serial No. 564,346. (No model.) Patented in Germany August 23, 1894, No. 76,777.

*To all whom it may concern:*

Be it known that I, JULIUS WILHELM VON PITTLER, a subject of the King of Prussia, German Emperor, residing at Leipsic-Gohlis, Germany, have made new and useful Improvements in Milling-Machines, (for which Letters Patent were granted to me in Germany, No. 76,777, dated August 23, 1894,) of which the following is a clear and exact specification.

This invention relates to certain improvements in universal milling-machines for metal working which can be used for milling all kinds of gear-wheels, for milling elongated slots, for round milling, and for other milling-work; and the invention consists of a milling-machine the essential characteristics of which are a cylindrical or semicylindrical slide which is guided on a vertical pillar and provided with an axially-rotatable ring, said ring containing in its forward part a bore which serves as a support for the slide-rest. As the ring is axially movable around the vertical slide and as the stock of the slide-rest is likewise axially adjustable in the ring, the slide-rest can be set to any angle in a horizontal plane, whereby it is possible to do milling-work of various kinds on the machine. The stock for the spindle of the milling-tool can be adjusted in a vertical plane to any desired angle, so that the milling-tool can be operated at an inclined position to the work, which is necessary in milling worms, worm gear-wheels, screw-gears, spiral boring-drills, &c., as will be fully described hereinafter and finally pointed out in the claims.

Figure 5:
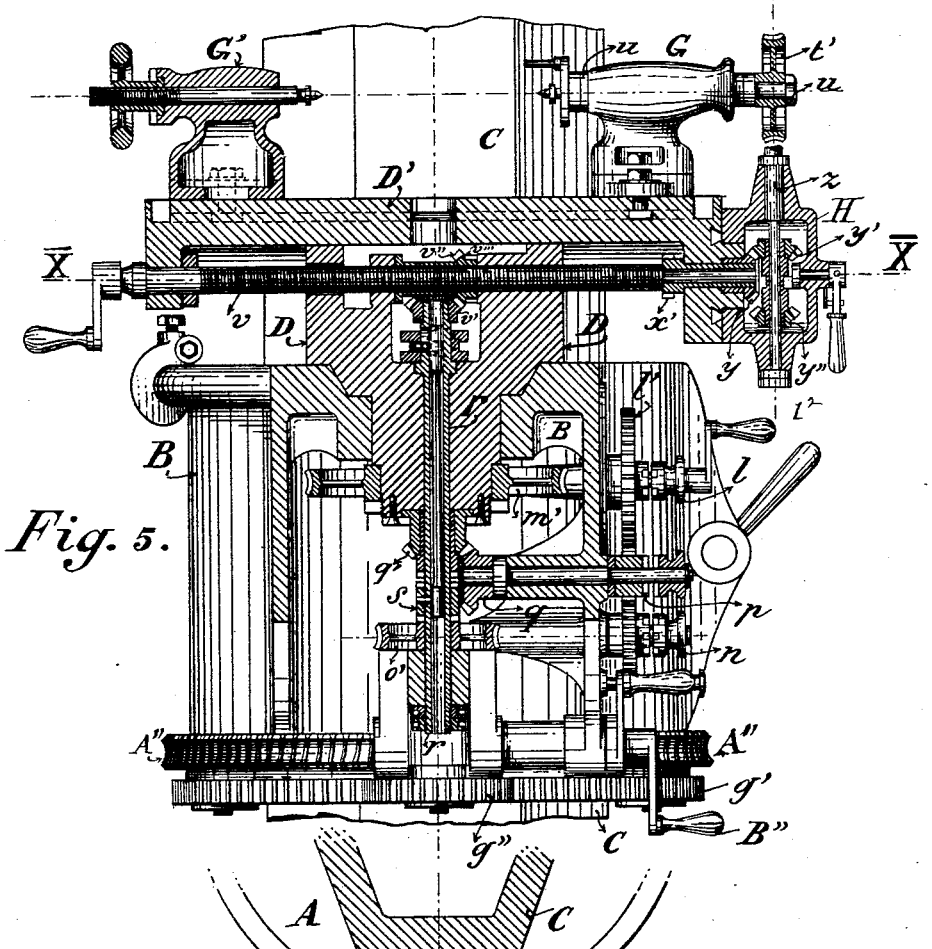
Figure 6:
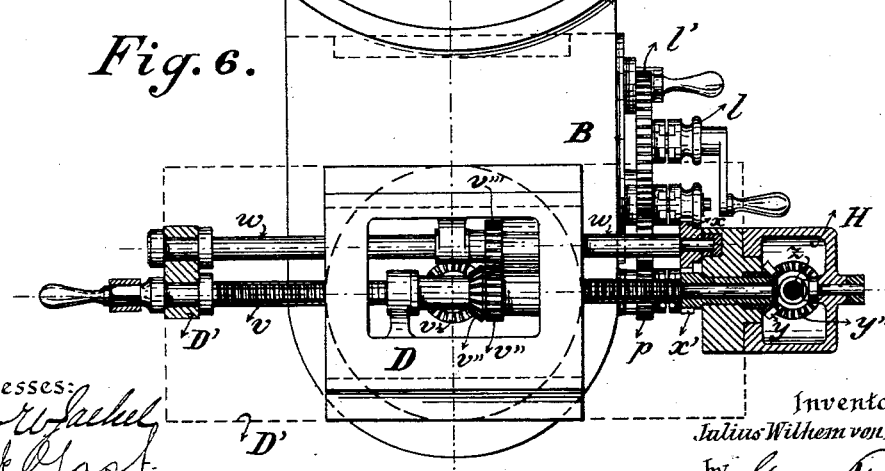

In the accompanying drawings, Figure 1 represents a vertical central section of my improved milling-machine. Fig. 2 is a front elevation of the same. Fig. 3 is a side elevation of the axially-adjustable supporting-ring drawn on a larger scale. Fig. 4 is a horizontal section on line Z Z, Fig. 3, showing the transmission of motion from the vertical driving-shaft to the slide-rest. Fig. 5 is a vertical transverse section on line Y Y, Fig. 3. Fig. 6 is a horizontal section on line X X, Fig. 5; and Figs. 7, 8, 9, 10, 11, and 12 are sectional plan views showing the application of the slide-rest of the machine respectively for milling ordinary gear-wheels, bevel gear-wheels, worm-wheels, spiral or screw wheels, crown-wheels, and for round milling generally.

Similar letters and figures of reference indicate corresponding parts.

Motion is imparted to the various parts of my improved milling-machine by a cone-pulley $a$, which is applied to a horizontal shaft $b$, that is supported in bearings at the upper part of the upright supporting-base $C'$, as shown in Figs. 1 and 2. By bevel-gears $d\, d'$, applied, respectively, to the shaft $b$ and to the stock of the milling-spindle $c$, rotary motion is transmitted to the latter. Rotary motion is also transmitted from the shaft $b$ by a friction-disk $e$ and friction-wheel $e'$ to a vertical shaft $f$, which is supported in neck and step bearings of the supporting-frame of the machine. The friction-wheel $e'$ is splined to the vertical shaft $f$ and longitudinally shiftable thereon relatively to the center of the friction-disk $e$, so that different degrees of speed can be imparted to the vertical shaft $f$.

The shaft $f$ passes through a vertical opening in a cylindrical slide A (shown in Figs. 1, 3, and 4) and is provided with a pinion $g$, which is splined to the shaft within the slide A, said pinion being longitudinally shiftable on the shaft, so as to follow the up or down movements of the slide A. The slide A is guided on a vertical pillar C, of prismatic cross-section. In the upper and lower part of the vertical prismatic pillar C is supported a screw-spindle F, (shown in Fig. 1,) which can be turned by bevel gear-wheels 1 and 2 and a crank F', applied to the shaft of the bevel gear-wheel 2, as shown in Fig. 2. The screw-spindle F passes through an interiorly-threaded block A', located at the interior of the slide A, so that when the screw-spindle is turned in one or the other direction the vertical slide A is raised or lowered with the block. The pinion $g$ of the shaft $f$ meshes with the interiorly-toothed ring-shaped gear-wheel $g'$, which is shown in Figs. 1, 3, and 4, and which is guided loosely on the slide A at the lower part of the same. The ring-shaped gear-wheel $g'$ is also provided with exterior teeth which engage a gear-wheel $g''$, by which the motion of the ring-shaped gear-wheel $g'$ is transmitted to a bevel gear-wheel $h$, located on the shaft of the gear-wheel $g''$, as shown in Fig. 1. This bevel gear-wheel $h$ is placed in mesh with a bevel gear-wheel $h'$, on the shaft of which is arranged a gear-wheel $i$. (Shown in Fig. 3.) On the vertical slide A is guided a ring B, in the bracket-shaped front part B' of which is arranged a cylindrical bore which forms the support or the stock of any suitable work-holder, which is shown in the form of a slide-rest D D'. When it is desired to impart an axially-rotating motion to the slide-rest D D', the gear-wheel $i$ is shifted so as to mesh with the gear-wheel $l'$, to the shaft of which is keyed a worm $m$, (shown in Fig. 1,) which meshes with a worm-wheel $m'$, that is attached to the stock D of the slide-rest D', as shown in Figs. 1 and 5, so that the slide-rest D' can be turned with the stock D on its own axis. The slide-rest D' is guided in the usual manner on dovetailed rails on the stock D. When it is desired to impart a reciprocating motion to the slide-rest D', a clutch $n$ (shown in Figs. 3 and 5) is placed in mesh with the gear-wheel $n'$, which latter is also in mesh with the gear-wheel $i$, so that thereby the worm $o$ and the worm-wheel $o'$, Figs. 1 and 5, can be set in rotary motion. The bevel-wheel $q'$, which serves for the quick return of the slide-rest D', is likewise rotated, when the clutch $n$ is placed in mesh with the gear-wheel $n'$, by means of the intermediate pinion $p'$ and gear-wheel $p$, as shown in Fig. 3. The worm-wheel $o'$, as well as the bevel-wheel $q'$, are placed loosely on the hollow shaft $r$. (Shown in Figs. 1 and 5.) When the clutch $s$ (shown in Figs. 1 and 5) is placed into mesh with the worm gear-wheel $o'$, the slide-rest D' is moved slowly forward, but it is quickly returned when the clutch $s$ is coupled with the bevel-wheel $q'$.

Figure 7:
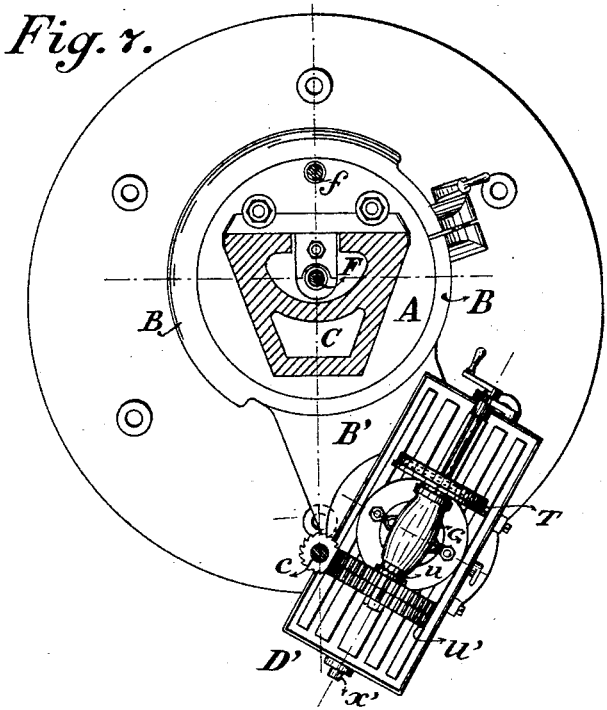
Figure 8:
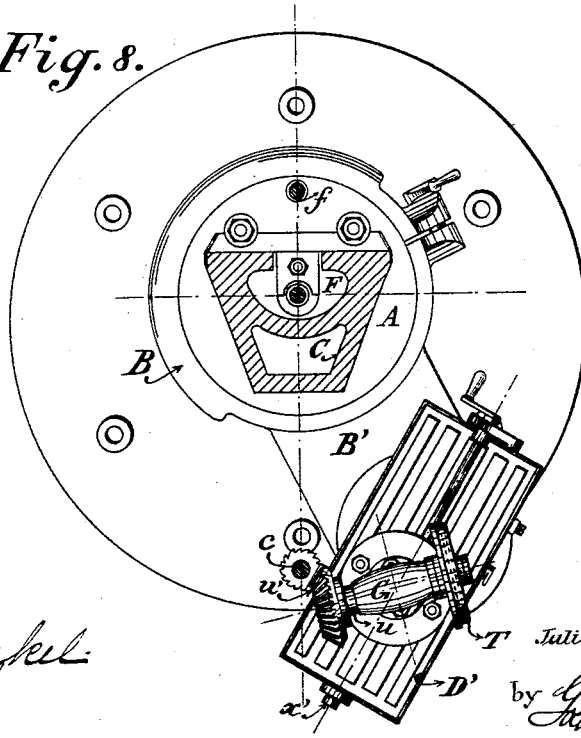
Figure 9:
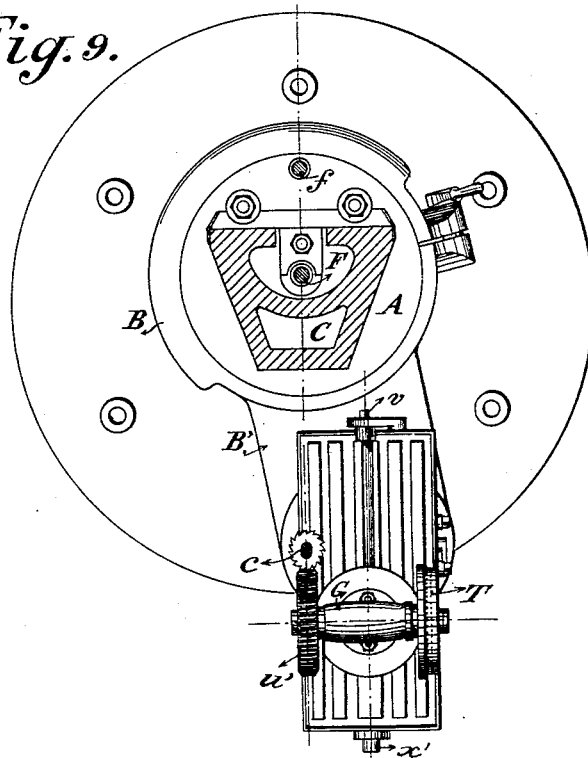
Figure 10:
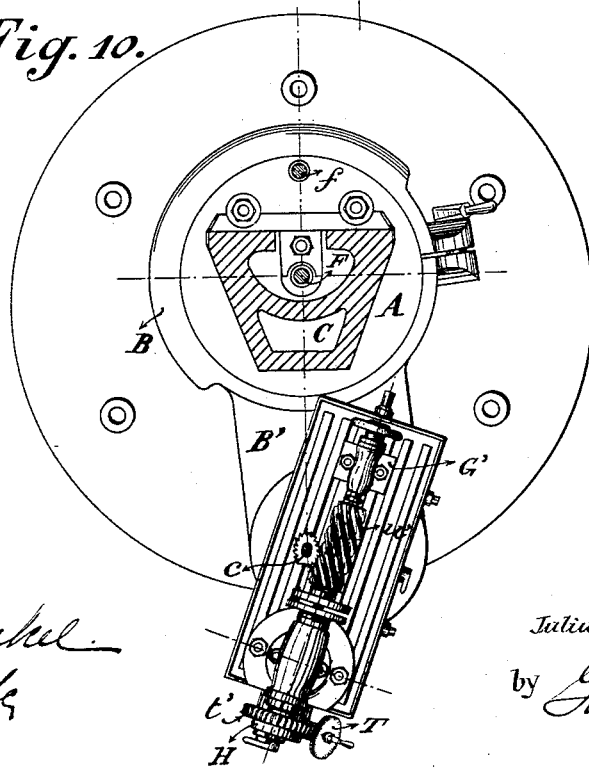
Figure 12:
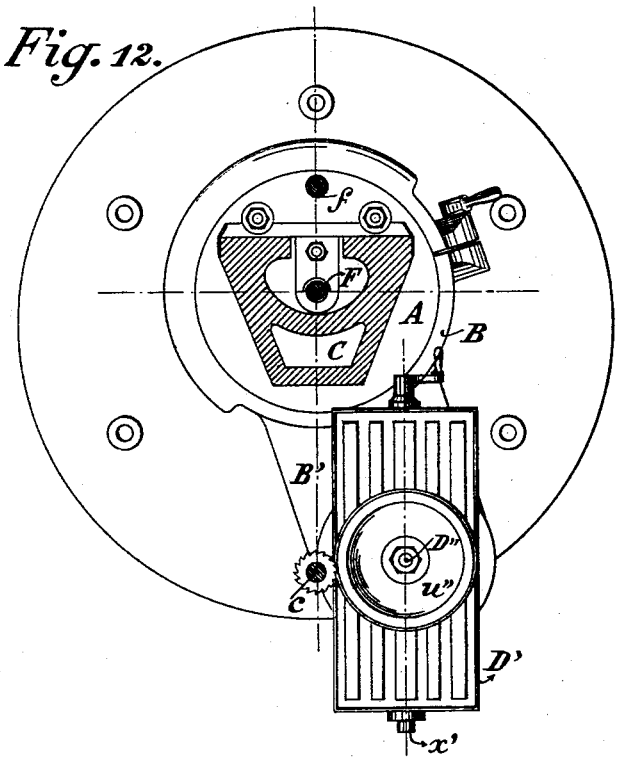
Figure 11:
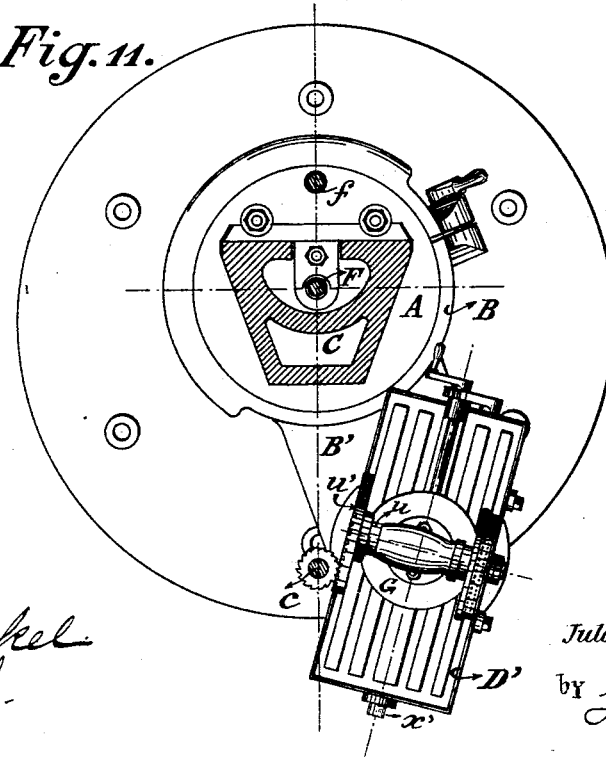

Figs. 7 to 12 show various applications of the machine for milling different articles. For this purpose the slide-rest D' is provided with a tail-stock G, which can be placed in any position relatively to its axis by a turn-table on which the same is supported. For milling ordinary gear-wheels the tail-stock G is so adjusted that the spindle $u$ of the same, on which the wheels $u'$ which are to be milled are mounted, is moved parallel to the direction of the motion of the slide-rest, so that the gear-wheels $u'$ to be milled are merely moved past the milling-tool $c$, as shown in Fig. 7. When bevel-wheels have to be milled, the wheel $u'$ is placed in such a position that the inclination or bevel of the teeth is parallel to the direction of motion of the slide-rest, as shown in Fig. 8. When the tail-stock G is placed at right angles to the direction of motion of the slide-rest, the milling-tool can be used for milling crown-wheels, as shown in Fig. 11. By placing the tail-stock G likewise at right angles to the direction of motion of the slide-rest worm-wheels can be milled, but it is necessary in this case that the slide-rest D' be placed at right angles to the spindle of the milling-tool $c$, as shown in Fig. 9. In this case the slide-rest D' receives as much motion as is required for producing the depth of the recesses between the teeth. For imparting to the teeth of worm-wheels the required pitch of thread it is necessary that the head E of the milling-spindle be set to an angle of inclination corresponding to the pitch of thread. The front part of the ring B, in which the slide-rest D D' is axially movable, can also be so arranged as to be adjustable on its axis, as shown in dotted lines in Fig. 6, by which also a vertical position of the slide-rest can be obtained. When spiral grooves such as in worm-gears have to be milled, a second tail-stock G' is mounted on the slide-rest D', as shown in Fig. 1, so that the piece to be milled can be supported on the centers of the tail-stocks G G', as shown in Figs. 2, 5, and 10. The tail-stock G is provided in this case with a change-wheel box H, which is shown in Figs. 3, 5, 6, and 10. It is further provided, in place of the ordinary dividing-disk T, (shown in Figs. 7 and 9,) with a worm-gear $t'$, which meshes with a worm $t$ of the change-wheel box H. The motion of the spindle $u$, Figs. 3, 5, 7, 8, 9, and 10, and thereby the turning of the object $u'$ to be milled, is then produced in the following manner: During the motion of the slide-rest the traversing screw-spindle $v$ is firmly clamped in position, but the bevel-wheel $v''$ is turned by the transmitting bevel-wheel $v'$, as shown in Figs. 5 and 6, whereby straight teeth on the hub of the bevel-wheel $v'$ mesh simultaneously with the gear-wheel $v'''$ and impart thereby rotary motion to the shaft $w$. The latter carries a gear-wheel $x$, which transmits motion to a toothed sleeve $x'$, which latter serves at the same time as a journal for the screw-spindle $v$. The sleeve $x'$ carries the bevel-wheel $y$, which is in mesh with the bevel-wheels $y'$ and $y''$, located in the change-wheel box H, so that the shaft $z$, and thereby the worm $t$, is turned at will in one or the opposite direction.

For round milling the slide-rest D' is provided midway of its length with a bolt D'', (shown in Fig. 12,) on which the article $u'''$ to be milled is mounted. By placing the clutch $l$ in mesh with the large gear-wheel $l'$ (shown in Figs. 3 and 5) rotary motion is imparted to the worm $m$ and worm-gear $m'$, Figs. 1 and 5, and by the latter to the entire slide-rest D D'. This kind of milling is used mainly when irregularities or projecting parts prevent the turning of the article on the lathe. In this manner eccentric or curved articles can be milled.

The ordinary milling operations are done in the well-known manner, the adjustment of the machine being effected either by setting the slide-rest D D' into the required position by the crank $l''$ or by the turning of the ring B by means of the crank B'', the worm $A^3$, and the worm-wheel A'', which is made integral with the slide A.

Having thus described my invention, I claim as new and desire to secure by Letters Patent—

1. In a universal milling-machine, the combination of an upright pillar, a vertically-adjustable main slide on said pillar, an axially-rotatable ring on said slide provided with a bracket-shaped support, and an axially-rotatable work-holder mounted in said support, and adapted to reciprocate in the arc of a circle and milling mechanism disposed above said work-holder.

2. In a universal milling-machine, the combination of an upright pillar, a main slide adjustable on said pillar, a ring guided on said main slide, a bracket-shaped support on said ring, a work-holder mounted in said support, means for imparting an axially-turning motion to said work-holder, means for imparting to said work-holder reciprocating motion in an arc of a circle, and milling mechanism disposed above said work-holder.

In testimony whereof I have signed my name to this specification in the presence of two subscribing witnesses.

JULIUS WILHELM VON PITTLER.

Witnesses:
  RUDOLPH FRICKE,
  ANDREW REINER.